Patented June 15, 1948

2,443,204

UNITED STATES PATENT OFFICE 2,443,204

SEPARATION OF MYRCENE FROM BETA-PINENE BY CHEMICAL TREATMENT AND DISTILLATION

William David Stallcup, Jacksonville, Fla., assignor, by mesne assignments, to The Glidden Company, Cleveland, Ohio, a corporation of Ohio No Drawing. Application March 11, 1944, Serial No. 526,141

6 Claims. (Cl. 202—57)

The present invention relates to the preparation of myrcene.

Goldblatt and Palkin J. A. C. S., 63, 3520 (1941), describe the preparation of myrcene by pyrolyzing beta pinene. The pyrolysate in addition to myrcene contains unreacted beta pinene, 1-limonene and probably other hydrocarbons. Myrcene is useful in the preparation of synthetic rubber, either as a co-polymerizing agent, or it may be used alone to produce synthetic rubber. The other terpenes present in the pyrolysate do not enter into the polymerization reaction but are undesirable in the product and must be removed from the rubber if present. This removal is difficult and it is, therefore, desirable to separate these hydrocarbons from the myrcene.

It is extremely difficult, however, to fractionate the pyrolysate, and in order to do so, a very highly efficient fractionating column is required. The boiling points of the pyrolysate components are quite close to each other, and in addition there appears to be an abnormal vapor pressure relationship between the various fractions since the operation is not as clean cut as would be expected if the pyrolysate behaved as an ideal mixture. In commercial operations the ideal conditions employed by Goldblatt and Palkin are not obtained, and the fractionation of the pyrolysate from such commercial operations is more difficult than is that of Goldblatt and Palkin.

It is accordingly an object of the present invention to provide an improved process for producing myrcene.

An additional object is to provide an improved process for purifying myrcene.

A further object is to provide a process whereby the fractionation of a beta pinene pyrolysate is simplified.

Another object is to provide a commercial process for preparing myrcene.

It has been found that the foregoing objects may be attained by treating the pyrolysate with a substance capable of preferentially reacting with beta pinene to form an addition compound, after which treatment the myrcene can be readily recovered by a simple distillation. Substances which are known to add to beta pinene are methanol and other alcohols, hydrohalides such as HCl, water, phenols, acetic acid, etc. These substances all add to beta-pinene by virtue of their proton-donor property which enables them to supply $H^+$ and a complementary negative radical for concomitant saturation of the double bond of beta-pinene. Also anhydrous formaldehyde may be employed to form a primary alcohol according to United States Patent 2,340,294. In place of treating the pyrolysate directly, the process may also be applied to the heads and tails obtained from the direct fractionation of the pyrolysate, whereby further quantities of myrcene can be recovered.

In cases where the addition substance is non-acidic or only weakly acidic, it is preferred to employ well known acidic catalysts, such as sulfuric acid, sulfonic acid, phosphoric acid, etc., which are known to catalyze the addition reaction.

The following examples are illustrative:

Example I

A beta pinene pyrolysate having a density of $.813^{25°}$ C. and $a_D{}^{25} - 12.4$ (10 cm.) was mixed with an equal quantity by weight of methanol and 2.5% sulfuric acid by weight of the pyrolysate and the mixture was heated at reflux for two hours. The reaction mixture was neutralized and the unreacted methanol removed. Rapid distillation of the methanol-free product thru a 2–3 plate column, gave the following fractions:

| Fr. No. | Boiling Range at 20 mm. Hg | Parts by Weight |
|---|---|---|
| | ° C. | |
| 1 | 62– 66 | [1] 58 |
| 2 | 66– 76 | 23 |
| 3 | 76– 88 | 11 |
| 4 | 88–105 | 73 |
| 5 | Res. | 18 |

[1] This fraction had $D^{25}$ 0.795, $a_D{}^{25}$ –4.3 (10 cm.).

Example II

A beta pinene pyrolysate ($D^{25}$ .813, $a_D$ –12.4 (10 cm.)) was mixed with equal parts of methanol and 2.5% of sulfuric acid and the mixture heated at reflux for four hours. After neutralization and removal of the excess methanol, rapid vacuum distillation through a 2–3 plate column gave the following fractions:

| Fr. No. | Boiling Range at 10 mm. Hg | Parts by Wt. | $D^{25}$ | $a_D$ (10 cm.) |
|---|---|---|---|---|
| | ° C. | | | |
| 1 | 54–57 | 46 | .799 | –2.60 |
| 2 | 57–63 | 9 | | –5.60 |
| 3 | 63–81 | 26 | .847 | –5.35 |
| 4 | 81–87 | 38 | .864 | –5.78 |
| 5 | Res. | 69 | .890 | |

Example III

One hundred parts by weight beta pinene pyrolysate ($D^{25}$ 0.813, $a_D$ —12.4 (10 cm.)) were mixed with 100 parts methanol and one part sulfuric acid and heated at reflux for two hours. After neutralization with caustic soda the excess methanol was washed out of the reaction mixture. A rapid distillation of the methanol-free reaction mixture through a 2-3 plate column gave the following results:

| Fr. No. | Boiling Range at 9 mm. Hg | Parts by Wt. | $D^{25}$ | $a_D$ (10 cm.) |
|---|---|---|---|---|
| | °C. | | | |
| 1 | 51–53 | 13 | | —6.91 |
| 2 | 53 | 46 | .791 | —6.97 |
| 3 | 53–54 | 33 | .793 | —9.42 |
| 4 | 54–56 | 13 | .798 | —13.43 |
| 5 | 56–66 | 22 | .818 | —16.06 |
| 6 | Res. | 80 | | |

Example IV

One hundred parts by weight of beta pinene pyrolysate ($D^{25}$ .813, $a_D$ —12.4 (10 cm.)) was mixed with one hundred parts methanol and one part sulfuric acid and heated to reflux at which time water was added in such a quantity as to produce an incipient turbidity. After refluxing for two hours the reaction mixture was neutralized and the excess methanol removed. Distillation of the methanol-free reaction product through a 2-3 plate column gave the following results:

| Fr. No. | Boiling Range at 10 mm. Hg | Parts by Wt. | $D^{25}$ | $a_D$ (10 cm.) |
|---|---|---|---|---|
| | °C. | | | |
| 1 | 52–3 | 37 | 0.797 | —7.4 |
| 2 | 53–53.5 | 40 | 0.795 | —7.7 |
| 3 | 53.5–54 | 22 | .795 | —8.0 |
| 4 | 54–55 | 18 | .796 | —12.3 |
| 5 | 55–57 | 20 | .808 | —22.4 |
| 6 | 57–67 | 19 | | —32.8 |
| 7 | Res. | 40 | | |

Example V

One hundred parts by weight beta pinene pyrolysate ($D^{25}$ .813, $a_D^{25}$ —12.4 (10 cm.)) was mixed with one hundred parts acetone and two and one-half parts sulfuric acid and heated to reflux. Water was then added to produce an incipient turbidity. After refluxing for eight hours, the reaction mixture was neutralized and the acetone removed. Distillation of the acetone-free product through a 2-3 plate column produced the following fractions:

| Fr. No. | Boiling Range at 20 mm. Hg | Parts by Wt. | $D^{25}$ | $a_D$ (10 cm.) |
|---|---|---|---|---|
| | °C. | | | |
| 1 | 62–66 | 55 | .799 | —6.8 |
| 2 | 66–67 | 16 | .795 | —7.6 |
| 3 | 67–68 | 16 | .795 | —8.9 |
| 4 | 68 | 15 | .798 | —11.7 |
| 5 | 68–70 | 21 | .805 | —18.6 |
| 6 | 70–73 | 13 | .814 | —37.5 |
| 7 | 73–80 | 15 | .837 | —32.8 |
| 8 | 80–90 | 12 | | —31.8 |
| 9 | Res. | 12 | | |

Example VI

One hundred parts by weight beta pinene pyrolysate ($D^{25}$ .813, $a_D^{25}$ —12.4 (10 cm.)) was mixed with one hundred parts methanol, two and one-half parts benzene sulfonic acid and twelve parts water. After heating at reflux for two hours the reaction mixture was neutralized and the water and methanol removed. Distillation of a sample of the methanol-free reaction product through a 2-3 plate column gave the following fractions:

| Fr. No. | Boiling Range at 9 mm. | Parts by Wt. | $D^{25}$ | $a_D$ (10 cm.) |
|---|---|---|---|---|
| | °C. | | | |
| 1 | 51–52 | 32 | .798 | —8.4 |
| 2 | 52–53 | 27 | .795 | —8.6 |
| 3 | 53–54 | 46 | .796 | —11.1 |
| 4 | 54–54.5 | 25 | .797 | —13.5 |
| 5 | 54.5–55 | 15 | .802 | —18.6 |
| 6 | 55–65 | 15 | | —32.9 |
| 7 | 65–90 | 29 | .882 | —49.1 |
| 8 | Res. | 14 | | |

Example VII

One hundred parts by weight of beta pinene pyrolysate, partially purified so that its density was .800$^{25}$ was mixed with 100 parts of 35% aqueous hydrogen chloride at room temperature for one hour. The mixture was then separated, the hydrocarbon layer washed with sodium carbonate solution and then with water. After drying a sample of the washed hydrocarbon a portion was distilled through a 2-3 plate column to give the following fractions:

| Fr. No. | Boiling Range at 9 mm. | Parts by Wt. | $D^{25}$ | $a_D$ (10 cm.) |
|---|---|---|---|---|
| | °C. | | | |
| 1 | 48–51 | 21 | .795 | —3.6 |
| 2 | 51–51.5 | 41 | .793 | —3.9 |
| 3 | 51.5 | 41 | .792 | —4.0 |
| 4 | 51.5–52 | 30 | .791 | —5.3 |
| 5 | 52–60 | 29 | .802 | —12.7 |
| 6 | 60–82 | 26 | .918 | |
| | Res. | 18 | | |

Example VIII

One hundred parts by weight of a partially purified beta pinene pyrolysate ($D^{25}$ .800) was mixed with four hundred parts methanol and five parts sulfuric acid. This mixture was refluxed for six hours and then after neutralization the methanol was removed by distillation. Distillation of the methanol-free reaction mixture through a 2-3 plate column gave the following fractions:

| Fr. No. | Boiling Range at 10 mm. | Parts by Weight |
|---|---|---|
| | °C. | |
| 1 | 52–56 | 12 |
| 2 | 56–77 | 8 |
| 3 | 77–80 | 8 |
| 4 | 80–82 | 11 |
| 5 | 82–85 | 11 |
| 6 | 85–87 | 12 |
| 7 | [1] 87–89 | 12 |
| 8 | [1] 89–98 | 8 |
| 9 | [1] 98 | 13 |
| 10 | Res. | 7 |

[1] Distilled at 6 mm. Hg pressure.

Example IX

Using a one to one reflux ratio and distilling through a 20 plate column having a 2 inch diameter, a beta pinene pyrolysate ($D^{25}$ .813) gave the following fractions:

| Fr. No. | Boiling Range at 20 mm. | Parts by Weight | $D^{25}$ |
|---|---|---|---|
| | ° C. | | |
| 1 | 56 –60 | 118 | .821 |
| 2 | 60 –64 | 175 | .814 |
| 3 | 64 | 172 | .810 |
| 4 | 64 –64.5 | 162 | .811 |
| 5 | 64.5 | 160 | .809 |
| 6 | 64.5 | 166 | .809 |
| 7 | 64.5 | 176 | .809 |
| 8 | 64.5 | 174 | .808 |
| 9 | 64.5–65 | 175 | .807 |
| 10 [1] | 64 | 162 | .810 |
| 11 | 64 –64.5 | 175 | .806 |
| 12 | 64.5–65.5 | 166 | .806 |
| 13 | 65.5 | 162 | .803 |
| 14 | 65.5–66 | 162 | .804 |
| 15 | 66 –67.5 | 133 | .805 |
| 16 | 67.5–70.5 | 99 | .811 |
| 17 | 70.5–75 | 125 | .831 |

[1] Fractionation temporarily stopped at this point.

Example X

One hundred parts by weight of a fraction obtained by the direct fractionation of a beta pinene pyrolysate and having a boiling range of 63–64° C./20 mm., $D^{25}$ 0.805 and $a_D$ –4.75 (10 cm.) was mixed with 100 parts methanol, three parts of benzene sulfuric acid and ten parts of water. This mixture was refluxed for four hours, neutralized and stripped of methanol. After washing the hydrocarbon layer was distilled through a 2–3 plate column to give the following cuts:

| Fr. No. | Boiling Range at 10 mm. | Parts by Wt. | $D^{25}$ | $a_D$ (10 cm.) |
|---|---|---|---|---|
| | ° C. | | | |
| 1 | 51.5–53 | 20 | .795 | –3.1 |
| 2 | 53 | 43 | .792 | –3.1 |
| 3 | 53 –54 | 30 | .791 | –3.3 |
| 4 | 54 –56 | 12 | | –4.8 |
| 5 | 56 –66 | 17 | | –9.2 |
| 6 | Res. | 37 | | |

The foregoing examples are given as illustrative of the invention and many variations and changes therein may be made without departing from the spirit and scope of the invention.

Thus other substances than those specifically mentioned may be employed to form the addition compounds with the beta pinene. It will, of course, be appreciated that such substances as hydrogen and halides which would form addition compounds with the myrcene under the conditions of the reaction, would not be employed where myrcene is to be recovered directly from the reaction mixture by fractionation.

Having described the invention, what is claimed is:

1. A process for recovering myrcene from a mixture containing myrcene and beta-pinene, which comprises the steps of: treating said mixture with a compound which is a proton-donor and has the formula HX in which X is a negative radical selected from the group consisting of halogen, alkoxy, aryloxy, acyloxy and hydroxy, under acid conditions to form an addition compound between the beta-pinene and the proton-donor compound; and fractionating the treated mixture to recover myrcene therefrom.

2. A process as claimed in claim 1 wherein said mixture is a pyrolysate of beta-pinene.

3. A process as claimed in claim 1 wherein said proton-donor compound is an aliphatic alcohol.

4. A process as claimed in claim 1 wherein said proton-donor compound is methanol.

5. A process as claimed in claim 1 wherein said proton-donor compound is hydrogen chloride in aqueous solution.

6. A process as claimed in claim 1 wherein said proton-donor compound is water.

WILLIAM DAVID STALLCUP.

REFERENCES CITED

The following references are of record in the file of this patent:

UNITED STATES PATENTS

| Number | Name | Date |
|---|---|---|
| 2,050,671 | Sheffield | Aug. 11, 1936 |
| 2,097,743 | Sheffield | Nov. 2, 1937 |
| 2,290,054 | Johnston | July 14, 1942 |
| 2,318,742 | Britton | May 11, 1943 |
| 2,332,370 | Cole | Oct. 19, 1943 |
| 2,393,894 | Farinacci | Jan. 29, 1946 |